United States Patent [19]

Ikedo et al.

[11] Patent Number: 5,633,563
[45] Date of Patent: May 27, 1997

[54] GAS DISCHARGE TUBE WITH DISCHARGE SHIELDING MEMBER

[75] Inventors: Tomoyuki Ikedo; Yoshinobu Ito; Ryotaro Matui, all of Hamamatsu, Japan

[73] Assignee: Hamamatsu Protonics K.K., Hamamatsu, Japan

[21] Appl. No.: 502,009

[22] Filed: Jul. 13, 1995

[30] Foreign Application Priority Data

Aug. 31, 1994 [JP] Japan .................. 6-207715

[51] Int. Cl.⁶ .................................. H01J 17/04
[52] U.S. Cl. .................. 313/614; 313/613; 313/623; 313/292; 313/590; 315/337; 315/94
[58] Field of Search .................. 313/590–591, 313/592, 593, 594, 595, 581–588, 616–622, 238–239, 240, 241, 242, 493, 631–632, 307, 306, 308, 292, 613, 614, 623; 315/337, 339, 94

[56] References Cited

U.S. PATENT DOCUMENTS

| | | | |
|---|---|---|---|
| 4,611,143 | 9/1986 | Shimazu et al. | 313/111 |
| 4,910,431 | 3/1990 | Witt et al. | 313/589 |
| 5,057,742 | 10/1991 | Kawai et al. | 313/623 |
| 5,191,260 | 3/1993 | Kawai et al. | 313/613 |

FOREIGN PATENT DOCUMENTS

| | | |
|---|---|---|
| 60-29400 | 2/1985 | Japan . |
| 4255662 | 9/1992 | Japan . |

*Primary Examiner*—Robert Pascal
*Assistant Examiner*—Arnold Kinkead
*Attorney, Agent, or Firm*—Cushman Darby & Cushman IP Group of Pillsbury Madison & Sutro, LLP

[57] ABSTRACT

A gas discharge tube includes a light-emitting section in an envelope sealing a gas therein, positioned at distal ends of lead pins while spaced from an inner side wall of the envelope. The light-emitting section includes a hot cathode, an anode, a focusing electrode, and a discharge shielding member having a front surface which faces the hot cathode. The front surface of the discharge shielding member is defined by a first surface being in direct contact with the focusing electrode, for defining a position of the focusing electrode, a second surface continued from the first surface, for defining a distance between the focusing electrode and the anode, and a third surface continued from the second surface and being in direct contact with the anode, for defining a position of the anode.

18 Claims, 9 Drawing Sheets

GAS DISCHARGE TUBE WITH DISCHARGE SHIELDING MEMBER

BACKGROUND OF THE INVENTION

1. Field of the invention

The present invention relates to a gas discharge tube and, more particularly, to a gas discharge tube used as an ultraviolet light source for a spectrophotometer, liquid chromatography, or the like.

2. Related background art

A conventional gas discharge tube is disclosed in Japanese Patent Laid-Open No. 4-255662. According to this prior art, a cathode and an anode, both of which are held by only lead lines, are disposed in a vessel, in which deuterium gas is sealed.

SUMMARY OF THE INVENTION

The present invention has as its object to provide a gas discharge tube which improves the operational stability during long-time continuous light emission and has a long service life.

If the anode generates heat upon reception of the thermoelectrons during long-time light emission, the anode itself is heated to a high temperature exceeding several hundred °C., and mechanical distortion is generated to change the distance between the anode and the focusing electrode plate. This change of distance results in the light emission of the gas discharge tube becoming unstable, and the service life of the discharge tube being undesirably shortened.

To achieve the above object, as shown in FIG. 1, a gas discharge tube relating to the present invention comprises: an envelope 1 (glass vessel) for sealing a gas therein; lead pins 4a to 4e introduced into an inner space of the envelope 1 from outside of the envelope 1; and a light-emitting section 2 in the envelope 1, positioned at distal ends of the lead pins and supported by the lead pins while spaced from an inner side wall 1A of the envelope 1.

As shown in FIGS. 2 to 4, the light-emitting section 2 includes: a hot cathode 7 for emitting thermoelectrons; an anode 8 for receiving the thermoelectrons emitted from the hot cathode 7; a focusing electrode 13 having a focusing opening 14a for converging and passing through thermoelectrons which are emitted from the hot cathode 7 and which are received by the anode 8; and a discharge shielding member 6 of an insulator (for example, ceramic, etc.) having a front surface which faces the hot cathode 7. The front surface of the discharge shielding member 6 is defined by: a first surface 601 being in direct contact with the focusing electrode 13, for defining a position of the focusing electrode 13; a second surface 602 continued from the first surface 601, for defining a distance between the focusing electrode 13 and the anode B; and a third surface 603 continued from the second surface 602, the third surface 603 being in direct contact with the anode 8, for defining a position of the anode 8.

Particularly, the second and third surfaces 602 and 603 of the front surface of the discharge shielding member 6 form a first depression 19 for accommodating the anode 8. Therefore, the third surface 603 corresponds to a bottom surface of the first depression 19 of the discharge shielding member 6, and the second surface 602 functions so as to define a distance between the focusing electrode 13 and the anode 8 at the time that the focusing electrode 13 is mounted on the first surface 601 and the anode 8 is mounted on the third surface 603.

The discharge shielding member 6 further has a rear surface 6A which is opposite the front surface of the discharge shielding member 6 and through holes 22a and 22b passing from the bottom surface (third surface 603) of the first depression 19 to the rear surface 6A of the discharge shielding member 6.

The anode 8 has a front surface 8A which faces the focusing electrode 13 and a rear surface 8B which faces the third surface 603 of the discharge shielding member 6, and a base portion 21c of a U-shaped connecting pin 21 is fixed on the rear surface 8B of the anode 8. The discharge shielding member 6 further has a second depression 20 at the third surface 603 of the front surface of the discharge shielding member 6, and the second depression 20 functions as a heat dissipation space of the anode 8. On the other hand, end portions 21a and 21b of the U-shaped connecting pin 21 are respectively passed through the through holes 22a and 22b and project from the rear surface 6A of the discharge shielding member 6 along a horizontal direction with respect to a surface 3A of the stem 3. Because the end portions 21a and 21b of connecting pin 21 are fixed at the rear surface 6A of the discharge shielding member 6 by a fixing devices 23a and 23b, the anode 8 is closely mounted on the discharge shielding member 6. Additionally, at least one of the end portions 21a and 21b of the connecting pin 21 is fixed at a distal end of a lead pin 4e for setting the anode 8 a predetermined potential, the lead pin 4e being introduced into an inner space of the envelope 1 from outside of the envelope 1.

The gas discharge tube of the present invention further includes: a front electrode 5 mounted on the front surface of the discharge shielding member 6, for accommodating the hot cathode 7 and shielding discharge of the hot cathode 7, thereby the hot cathode 7 is housed in a space defined by the front electrode 5 and the focusing electrode 13. A cathode electrode 17 is disposed in the space and separates a space for housing the hot cathode 7 from a space defined by the focusing opening 14a and the front electrode 5, for shielding discharge of the hot cathode 7. Furthermore, the front electrode 5 has a window 12 at a position opposite to the anode 8 through the focusing opening 14a of the focusing electrode 13, for outputting light generated during gas discharge, and the cathode electrode 17 has a slit 17a through which the thermoelectrons emitted from the hot cathode 7 can pass to the anode 8.

In the gas discharge tube according to the present invention, a trigger voltage of, e.g., 350 to 500 V is applied between the hot cathode and the anode. Thermoelectrons emitted from the hot cathode are converged by the focusing electrode positioned between the hot cathode and the anode. At this time, arc discharge occurs in front of the focusing electrode. Light extracted from an arc ball by this arc discharge is externally projected from the closed vessel. The anode generates heat upon reception of the thermoelectrons. The anode itself is heated to a high temperature exceeding several hundred °C.

Since the focusing electrode is mounted on and supported by the first surface of the front surface of the discharge shielding member, and the anode is mounted on and supported by the third surface (the bottom surface of the first depression) of the front surface of the discharge shielding member, the second surface of the front surface of the discharge shielding member functions so as to define the distance between the focusing electrode and the anode. For this reason, deformation of the anode or the focusing electrode hardly occurs, and a predetermined distance will be maintained between the anode and the focusing electrode.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

Figure 1:
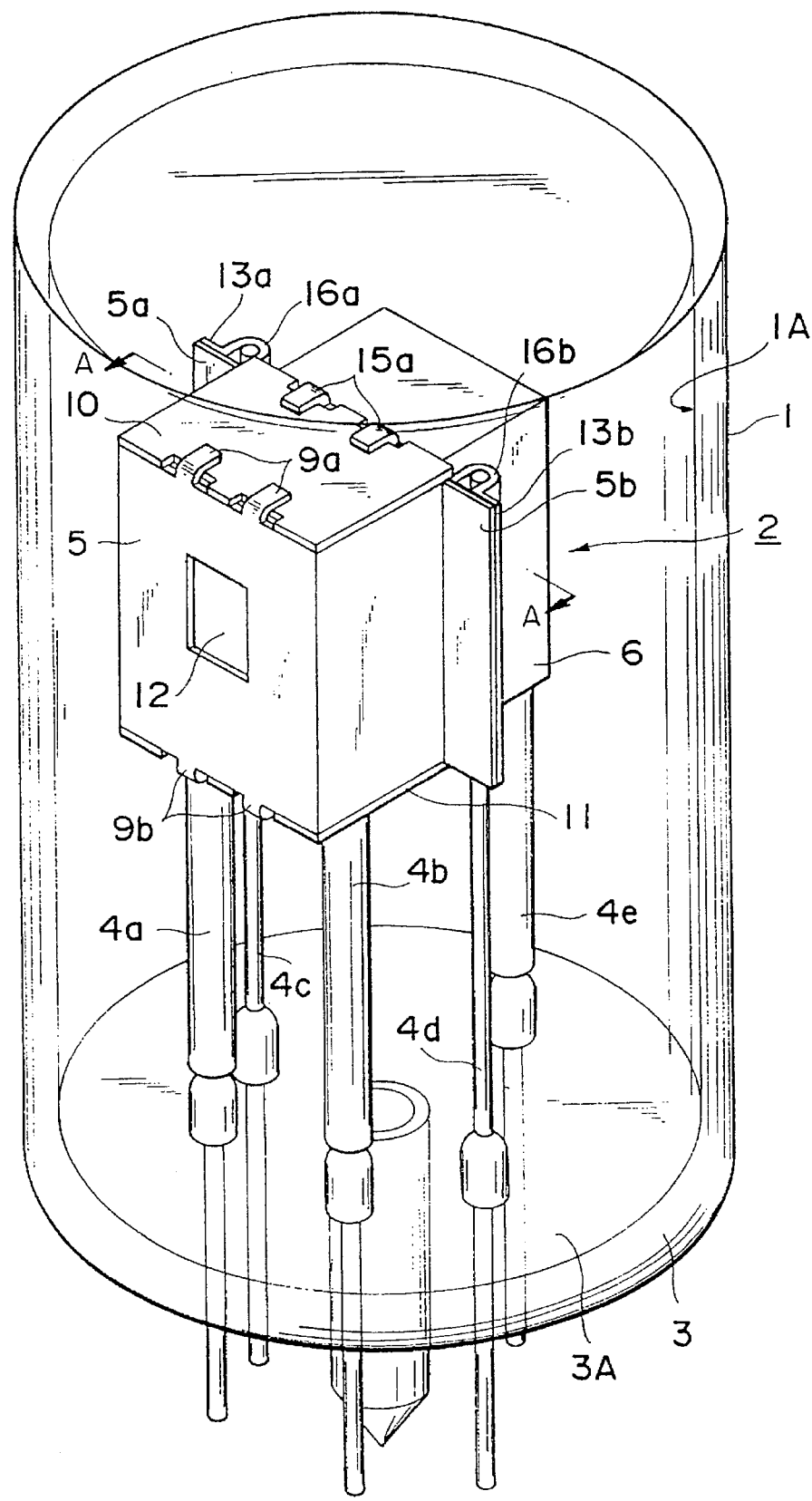
FIG. 1 is a perspective view showing the outer appearance of a side-on type gas discharge tube according to a first embodiment of the present invention.

A preferred embodiment of a gas discharge tube according to the present invention will be described below in detail with reference to the accompanying drawings. In a side-on type deuterium discharge tube shown in FIG. 1, reference numeral 1 denotes a closed glass envelope (also to be called a glass vessel). A light-emitting section assembly 2 is disposed in an inner space of the envelope 1 (glass vessel). By fusing a glass stem 3 forming part of the envelope 1 for the bottom portion of the envelope 1, the glass envelope 1 in which deuterium is sealed at several Torr can be hermetically sealed. Lead pins 4a, 4b, and 4e, all of which are covered by a ceramic pipe, and bare lead pins 4c and 4d extend from the lower portion of the light-emitting section 2 to the surface 3A of the stem 3. These lead pins 4a to 4e extend through the stem 3 to be externally exposed. The light-emitting section 2 has a front electrode 5 as a front cover arranged at the front side of the light-emitting section 2 and made of a metal (Ni or Stainless Steel), and a ceramic discharge shielding member 6 arranged at the rear side of the light-emitting section 2.

In this light-emitting section 2, the entire front surface of the discharge shielding member 6 is covered by a front cover assembly formed of the front electrode 5, an upper cover piece 10, and a lower cover piece 11, and a hot cathode 7 is housing in a space defined by the front cover assembly and the discharge shielding member 6. The front electrode 5 has a window 12 for outputting light caused by gas discharge. The embodiments of this invention relate to for example U.S. patent application Ser. No. 08/305,972, Japanese Patent Laid-Open No. 4-255662, and the like. Particularly, a basic structure of the gas discharge tube and materials of members such as anode, etc. are described in these references. For example, the discharge shielding member 6 are made of an insulator such as ceramic, and the anode plate 8 is made of a high melting point metal such as molybdenum. In this specification, a high melting point metal means a material group having a higher melting point than sillicon (1414° C.).

Figure 2:
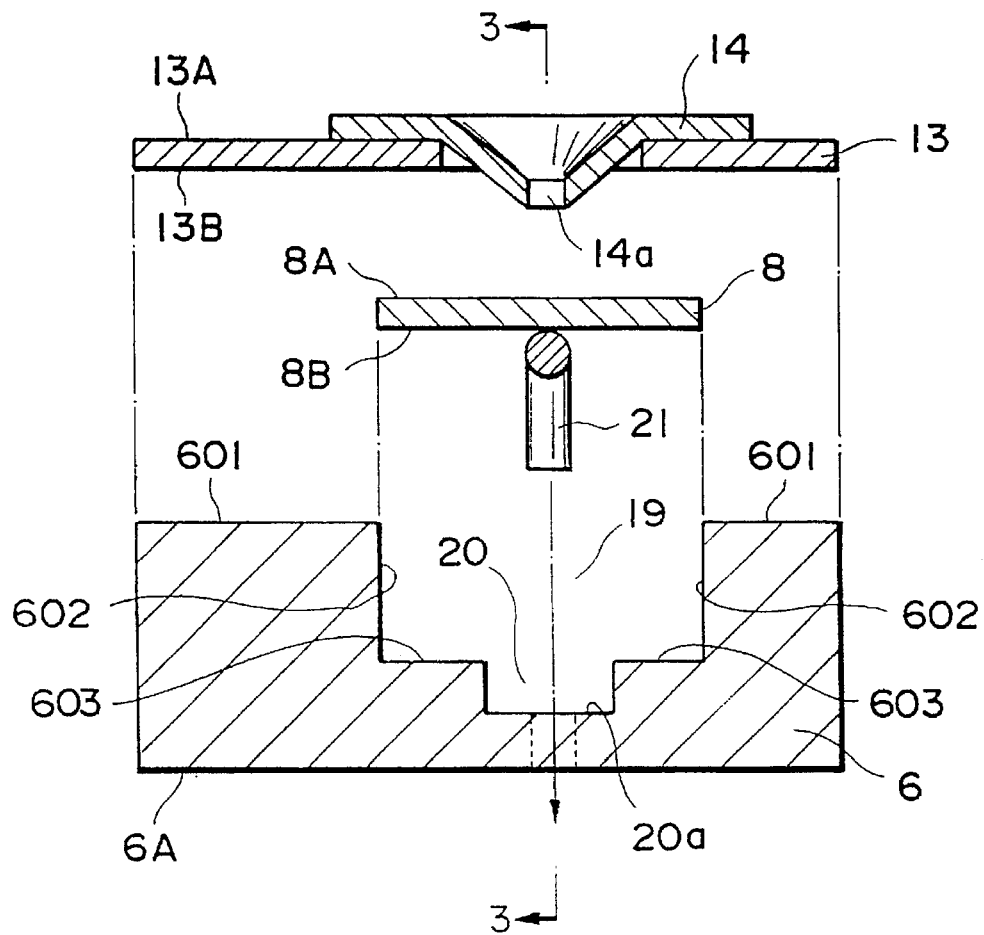
FIG. 2 is a sectional view of the light-emitting section taken along a line A—A in FIG. 1.
Figure 3:
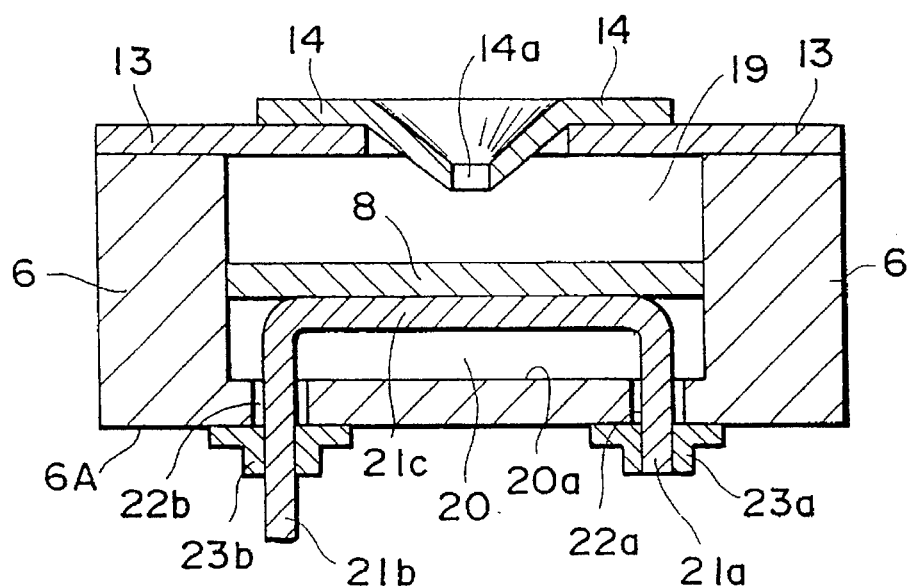
FIG. 3 is a sectional view of the light-emitting section taken along a line B—B in FIG. 2.
Figure 4:
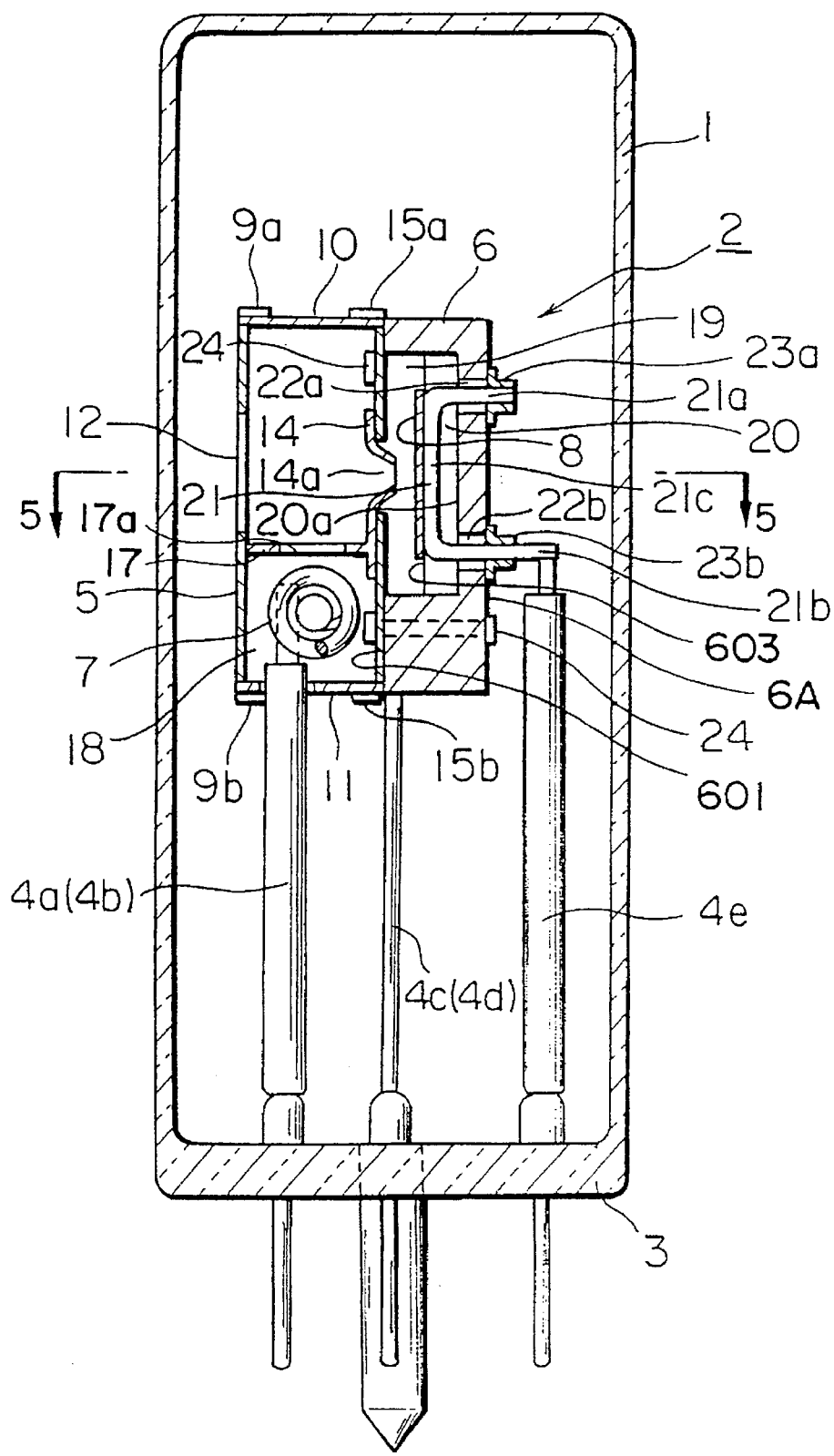
FIG. 4 is a longitudinal sectional view of the gas discharge tube of the present invention shown in FIG. 1.

The front surface of the ceramic discharge shielding member 6 of the light-emitting section 2 faces the hot cathode 7 for emitting thermoelectrons (shown in FIG. 4). The front surface of the discharge shielding member 6, as shown in FIGS. 2 and 3, is defined by at least three surfaces. A first surface 601 of the front surface of the discharge shielding member 6 is in direct contact with the focusing electrode 13 having a focusing opening 14a for converging and passing thermoelectrons emitted from the hot cathode 7 to the anode 8. Thus the first surface 601 functions so as to define a position of the focusing electrode 13. A third surface 603 of the front surface of the discharge shielding member 6 is in direct contact with the anode 8 for receiving the thermoelectrons emitted from the hot cathode 7, and thereby the third surface 603 functions so as to define a position of the anode 8. A second surface 602 of the front surface of the discharge shielding member 6 connects the first surface 601 to the third surface 603, thereby the second surface 602 functions so as to define a distance between the focusing electrode 13 and the anode 8.

In particular, the second and third surfaces 602 and 603 of the front surface of the discharge shielding member 6 form a first depression 19 for accommodating the anode 8. The discharge shielding member 6 further has a second depression 20 for a heat dissipation of the anode 8, and has a rear surface 6A which is located at a rear surface side of the anode 8. The second depression 20 and the rear surface 6A of the discharge shielding member 6 are connected by through holes 22a and 22b.

The anode 8 has a front surface 8A which faces the focusing electrode 13 and a rear surface 8B which faces the third surface 603 of the discharge shielding member 6. A base portion 21c of a U-shaped connecting pin 21 is fixed on the rear surface 8B of the anode 8 and accommodated in the second depression 20. On the other hand, end portions 21a and 21b of the U-shaped connecting pin 21 are respectively passed through the through holes 22a and 22b and project from the rear surface 6A of the discharge shielding member 6 to the outside of the discharge shielding member 6. These portions 21a and 21b are fixed by fixing devices 23a and 23b at the rear surface side of the discharge shielding member 6. Furthermore, at least one of the end portions 21a and 22b is fixed at a distal end of the lead pin 4e for setting the anode 8 at a predetermined potential.

Figure 5:
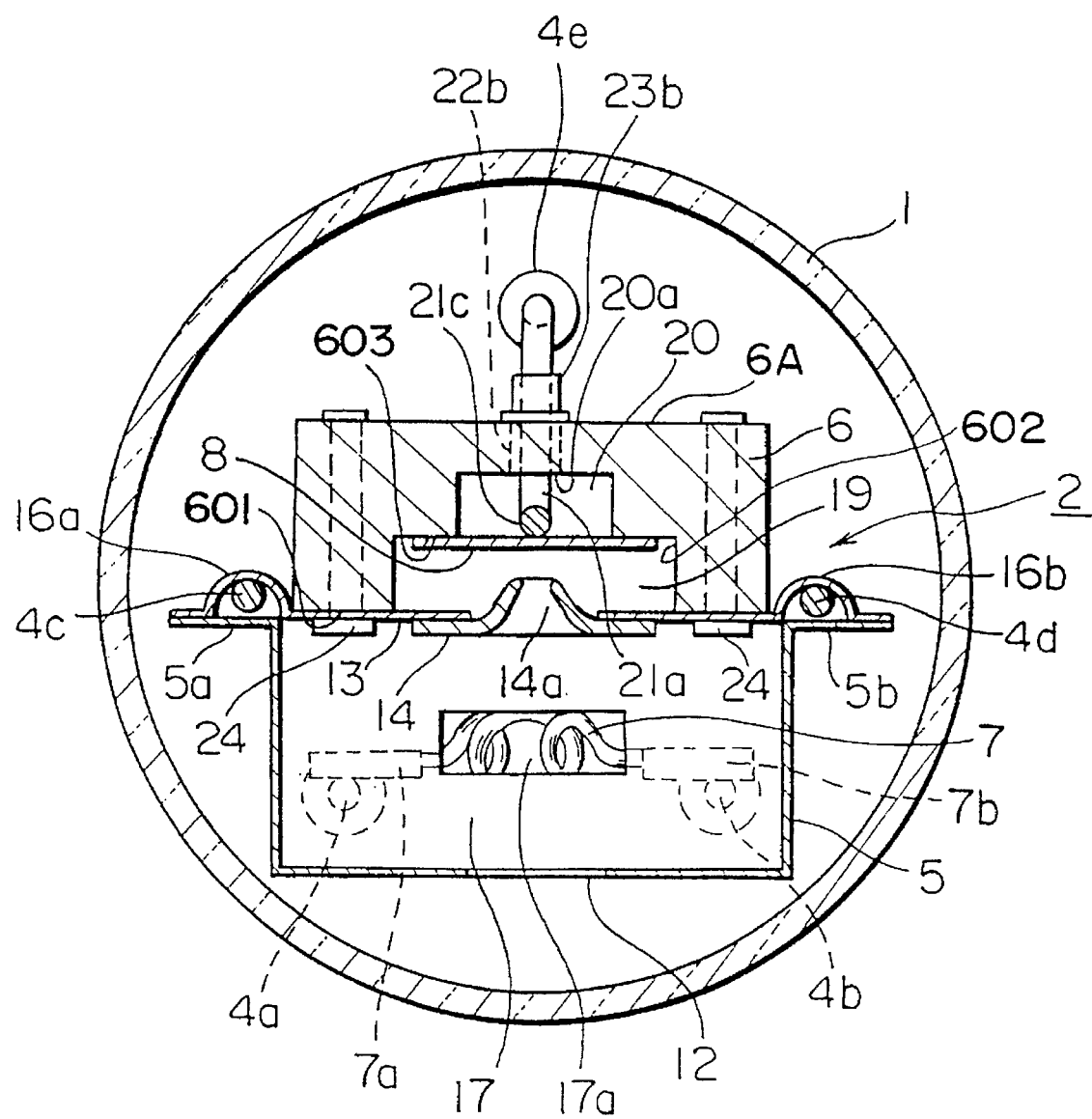
FIG. 5 is a sectional view of the gas discharge tube of the present invention taken along a line C—C in FIG. 4.
Figure 6:
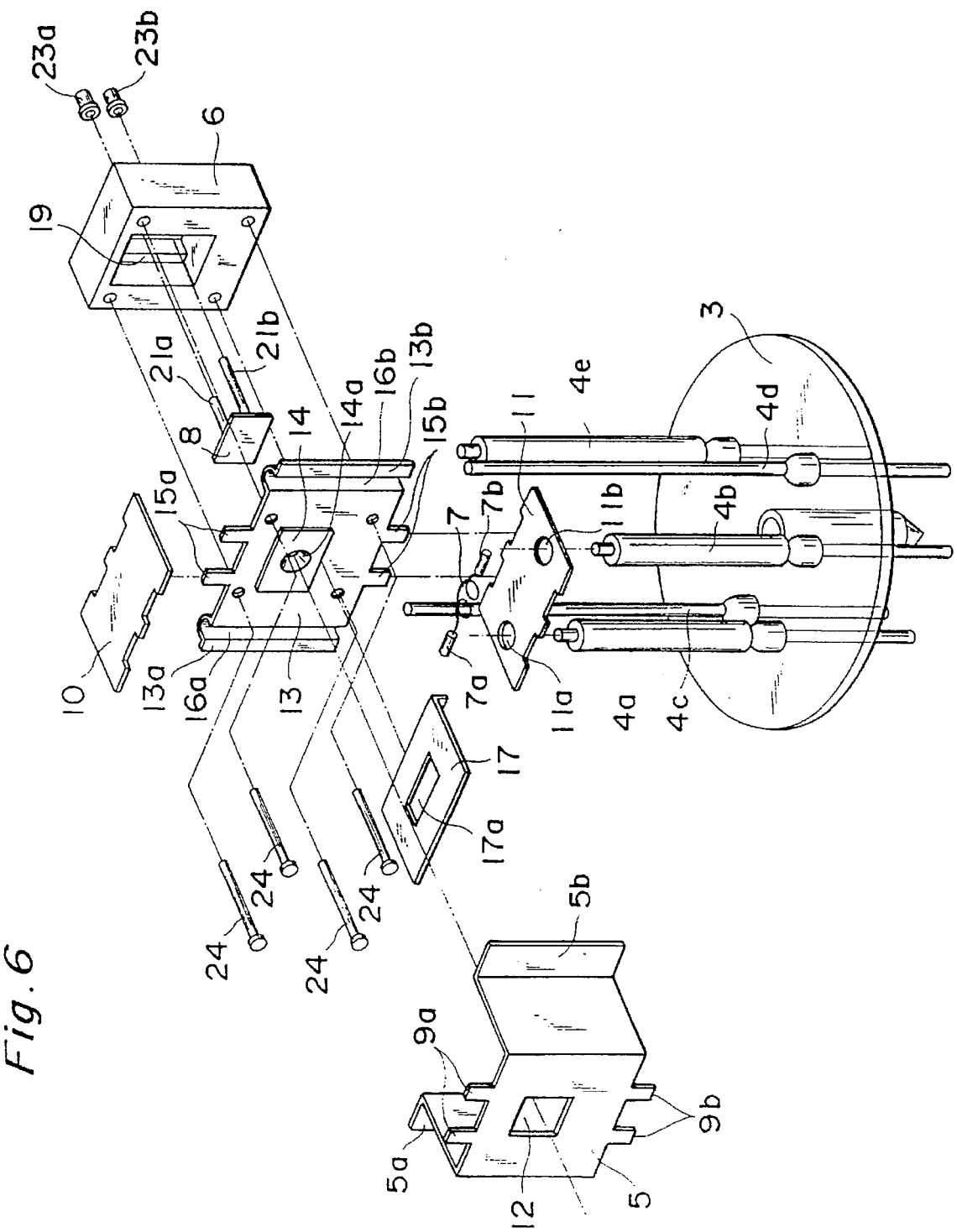
FIG. 6 is an exploded perspective view of the light-emitting section of the gas discharge tube of the present invention shown in FIG. 1.
Figure 7:
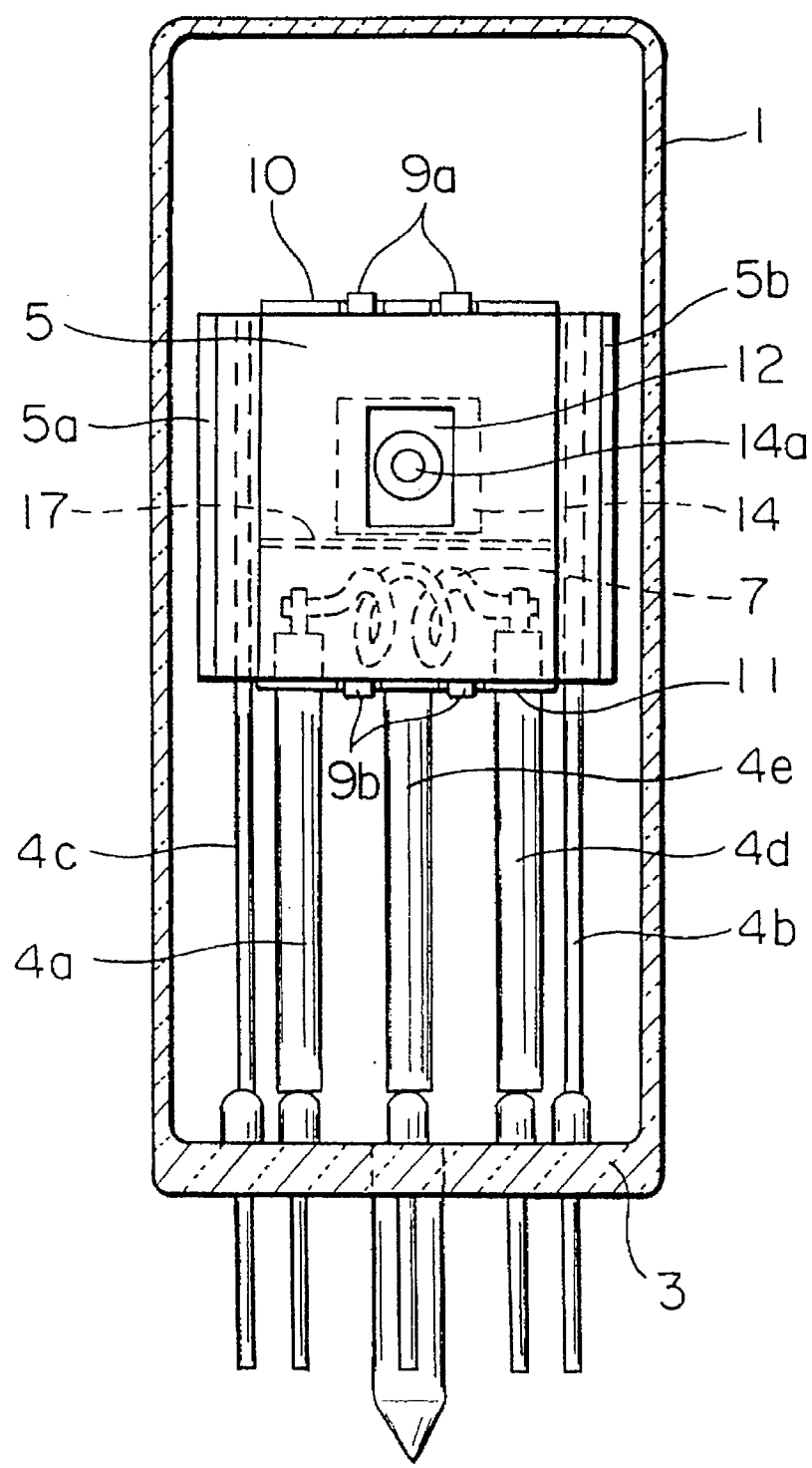
FIG. 7 is a front view of the gas discharge tube of the present invention shown in FIG. 1.
Figure 8:
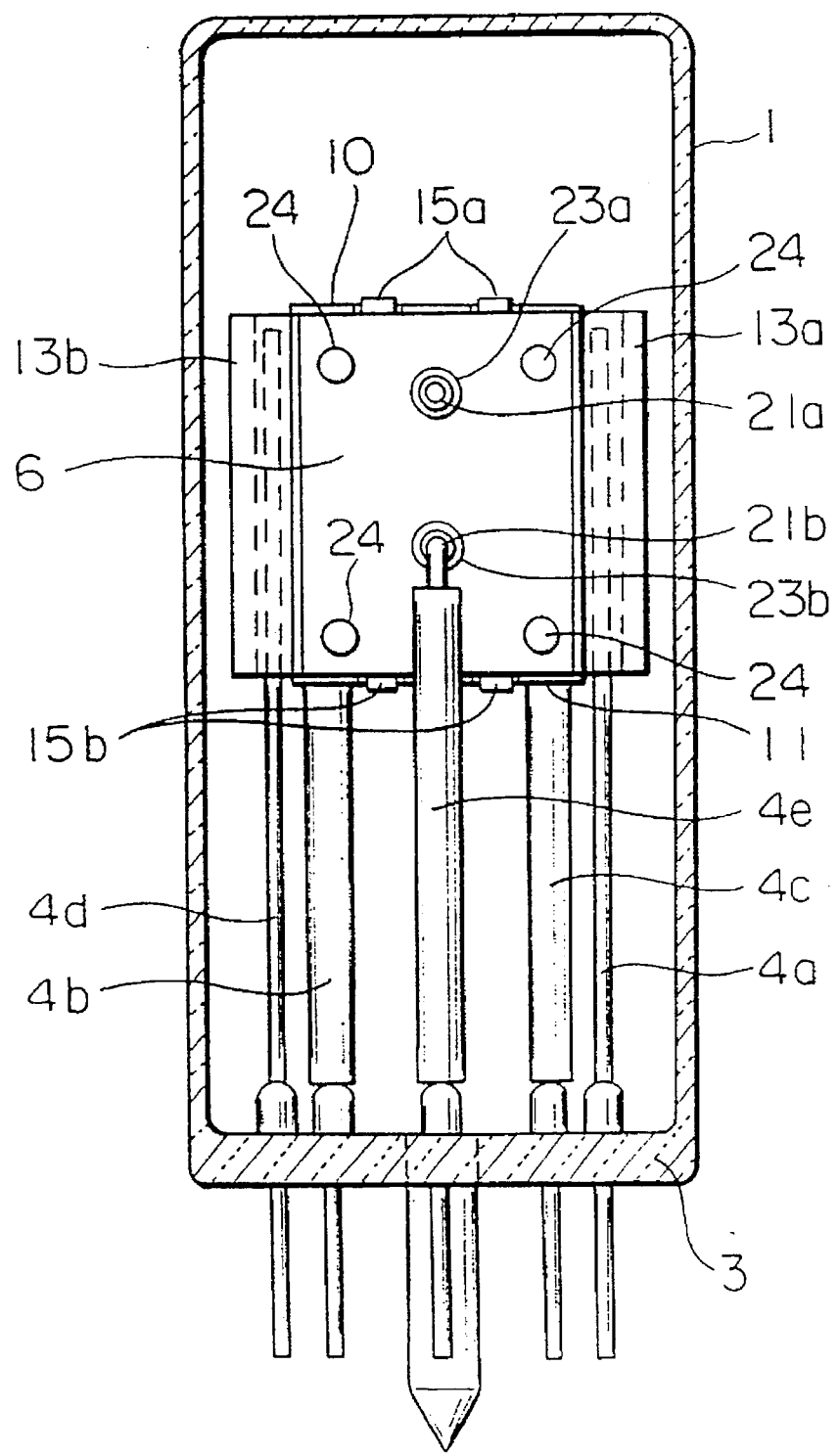
FIG. 8 is a rear view of the light-emitting section of the gas discharge tube of the present invention shown in FIG. 1.

Next, as shown in FIGS. 4 and 5, a spiral hot cathode 7 having electrode rods 7a and 7b at the two ends thereof is in a space defined by the front cover assembly and the focusing electrode 13. The front cover assembly is formed by the front electrode 5, an upper cover piece 10 arranged at an upper portion of the front electrode 5 (a top surface side of the glass envelope 1), and a lower cover piece 11 arranged at a bottom portion of the front electrode 5 (stem side). A rectangular flat plate-like anode 8 is accommodated in the discharge shielding member 6. As shown in FIG. 6, the front electrode 5 is bent to have a substantially U-shaped section, and flange portions 5a and 5b are integrally formed at its two ends. Pawl pieces 9a and 9b free to be bent and engaged with one end of an upper cover piece 10 or a lower cover piece 11, both of which are made of a metal (Ni or Stainless Steel), are formed at the head and bottom portions of the front electrode 5. An opening window 12 for projecting light is formed in the front electrode 5 at its center. Through holes 11a and 11b through which the two cathode lead pins 4a and 4b extend are formed in the lower cover piece 11.

A focusing electrode plate 13 for converging thermoelectrons is arranged between the front electrode 5 and the front surface of the discharge shielding member 6. The focusing electrode 13 serves as a cover on the rear surface side of the front electrode 5 and also serves as a partition wall between the front electrode 5 and the discharge shielding member 6. A discharge focusing plate 14 is fixed at the center of a front surface 13A of the focusing electrode 13 to oppose the opening window 12 while a rear surface 13B of the focusing electrode 13 is in close contact with the first surface 601 of the front surface of the discharge shielding member 6. A focusing opening 14a in parallel alignment with the opening window 12 at a predetermined interval is formed in the discharge focusing plate 14. The focusing opening 14a is tapered toward the anode 8 (see FIGS. 2 to 5). Pawl pieces 15a and 15b, free to be bent and engaged with one end of the upper cover piece, 10 or the lower cover piece 11 are formed at the head and bottom portions of the focusing electrode 13. Therefore, when the upper and lower cover pieces 10 and 11 are arranged to be brought into contact with the head and bottom surfaces of the front electrode 5 and the focusing electrode 13, while the upper and lower cover pieces 10 and 11 are respectively arranged in a horizontal direction with respect to the surface 3A of the glass stem 3, and the pawl pieces 9a and 9b and 15a and 15b are respectively bent inward so as to sandwich the upper and lower cover pieces 10 and 11, the upper and lower portions of the front electrode 5 can be closed.

Flange portions 13a and 13b facing the flange portions 5a and 5b of the front electrode 5 are integrally formed at the two ends of the focusing electrode 13. Curved pin accommodation portions 16a and 16b are formed at the flange portions 13a and 13b in the longitudinal direction to accommodate the lead pins 4c and 4d for supporting the focusing electrode 13. Therefore, when the lead pins 4c and 4d are welded to the pin accommodation portions 16a and 16b, and thereafter, the flange portions 5a and 5b are welded to the flange portions 13a and 13b, the focusing electrode plate 13 can be properly fixed to the front 5. As a result, each of the front electrode 5 and the focusing electrode 13 has a same voltage potential.

As shown in FIG. 4, a cathode electrode plate 17 as an intermediate focusing plate 17 which is arranged between the upper and lower cover pieces 10 and 11 in parallel thereto, fixed to the focusing electrode 13, and made of a metal (Ni or Stainless Steel) is disposed above the spiral hot cathode 7. As a result, each of the front electrode 5, the focusing electrode 13, and the cathode electrode 17 has a same potential. An elongated slit 17a for focusing thermoelectrons emitted from the hot cathode 7 is formed in the cathode electrode 17 at its center. Therefore, the cathode electrode 17, the lower cover piece 11, the front electrode 5, and the focusing electrode 13 define a space 18 for accommodating the hot cathode 7. The thermoelectrons emitted from the hot cathode 7 pass through the slit 17a and are converged toward the focusing opening 14a.

As shown in FIGS. 4 and 5, the box-like discharge shielding member 6 is integrally formed of a ceramic material having electrical insulating properties and a high thermal conductivity. The discharge shielding member 6 acts as a heat sink for the anode plate 8 heated to a high temperature and promotes dissipation of the heat accumulated in the light-emitting section 2. In addition, the discharge shielding member 6 has a first recessed portion 19, as an anode accommodation space for accommodating the anode plate 8, formed from the first surface 601 the front surface toward a rear surface 6A of the discharge shielding member 6. The periphery of the plate-like anode 8 is supported in contact with a bottom surface (the third surface 603 of the front surface of the discharge shielding member 6) of the first depression 19. A second recessed portion 20, as a rectangular heat dissipation space for a heat dissipation of the anode plate 8, is formed in the bottom surface (the third surface 603) at its center to increase the heat dissipation efficiency of the anode 8. The second depression 20 can also accommodate a base portion 21c of a U-shaped connecting pin 21 which is fixed to the rear surface 8B of the anode 8.

A first end portion 21a and a second end portion 21b of the connecting pin 21 are respectively inserted into through holes 22a and 22b formed from a bottom surface 20a of the second depression 20 toward the rear surface 6A, as shown in FIGS. 2 to 8, and can also project from the rear surface 6A of the discharge shielding member 6. Therefore, with a simple operation such that eyelets 23a and 23b as a fixing means are firmly fitted in the first and second end portions 21a and 21b projecting from the rear surface 6A, the connecting pin 21 will be fixed to the rear surface 6A of the discharge shielding member 6, and at the same time, the anode plate 8 will be supported in contact with the bottom surface 603 of the first depression 19. In addition, the focusing electrode 13 is firmly fixed to the first surface 601 of the front surface of the discharge shielding member 6 through four rivets 24. For this reason, when the flange portions 13a and 13b of the focusing electrode 13 are welded to the flange portions 5a and 5b in correspondence with each other, the front electrode 5 will be firmly fixed to the discharge shielding member 6. The first and second end portions 21a and 21b of the connecting pin 21 may be fixed to the rear surface 6A of the discharge shielding member 6 by welding or the like as a fixing means in place of the above eyelets 23a and 23b.

The distal ends of the lead pins 4a and 4b are fixed to the electrode rods 7a and 7b of the hot cathode 7 by welding or the like. The distal end of the lead pin 4e is fixed to the second end portion 21b of the connecting pin 21 arranged on the rear surface 8B of the anode plate 8 by welding or the like. The distal ends of the lead pins 4c and 4d are fixed to the pin accommodation portions 16a and 16b of the focusing electrode 13 by welding or the like.

An operation based on the arrangement of the above-described side-on type deuterium discharge tube will be described below.

First of all, the hot cathode 7 is energized and sufficiently heated. Thereafter, a predetermined trigger voltage (e.g., 350 to 500 V) is applied between the hot cathode 7 and the anode 8 through the lead pins 4a to 4e. Thermoelectrons emitted from the hot cathode 7 pass through the elongated slit 17a of the cathode electrode 17 and are converged by the focusing opening 14a of the focusing electrode plate 14, which is in direct contact with the front surface 13A of the focusing electrode plate 13, to reach the anode 8. At this time, arc discharge occurs in front of the focusing opening 14a. Ultraviolet light extracted from an arc ball by the arc discharge passes through the opening window 12 of the front electrode 5 and is externally emitted through the glass vessel 1.

The anode plate 8 and the focusing electrode plate 13 are heated to a high temperature exceeding several hundred ° C. This heat is dissipated through the ceramic discharge shielding member 6 as needed. Since the anode 8 and the focusing electrode 13 are firmly held by the discharge shielding member 6, deformation hardly occurs even in a high temperature state during long-time continuous light emission. Therefore, a high positional precision between the anode 8 and the focusing electrode 13 can be satisfactorily maintained.

Figure 9:
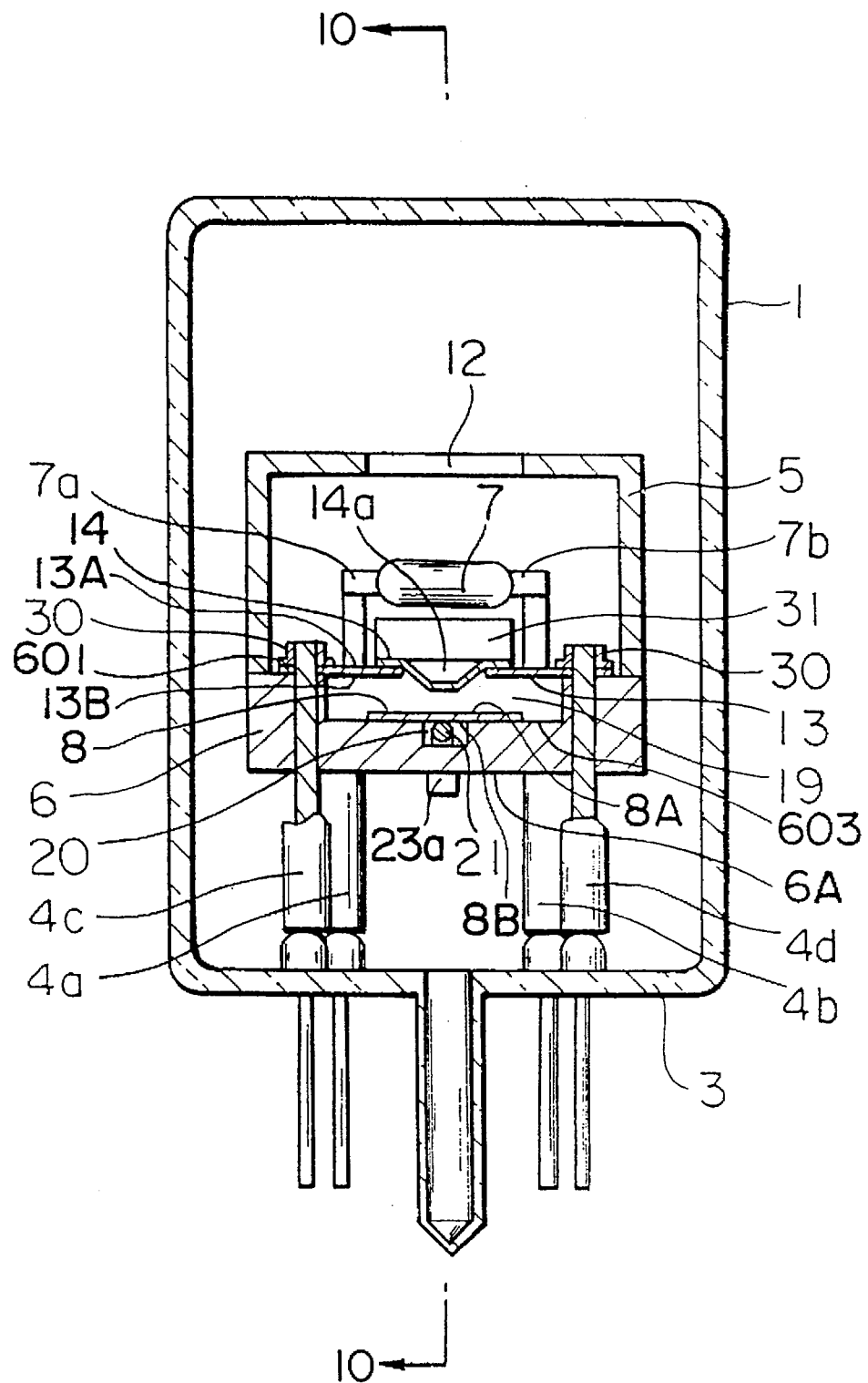
FIG. 9 is a longitudinal sectional view showing a head-on type gas discharge tube according to a second embodiment of the present invention.
Figure 10:
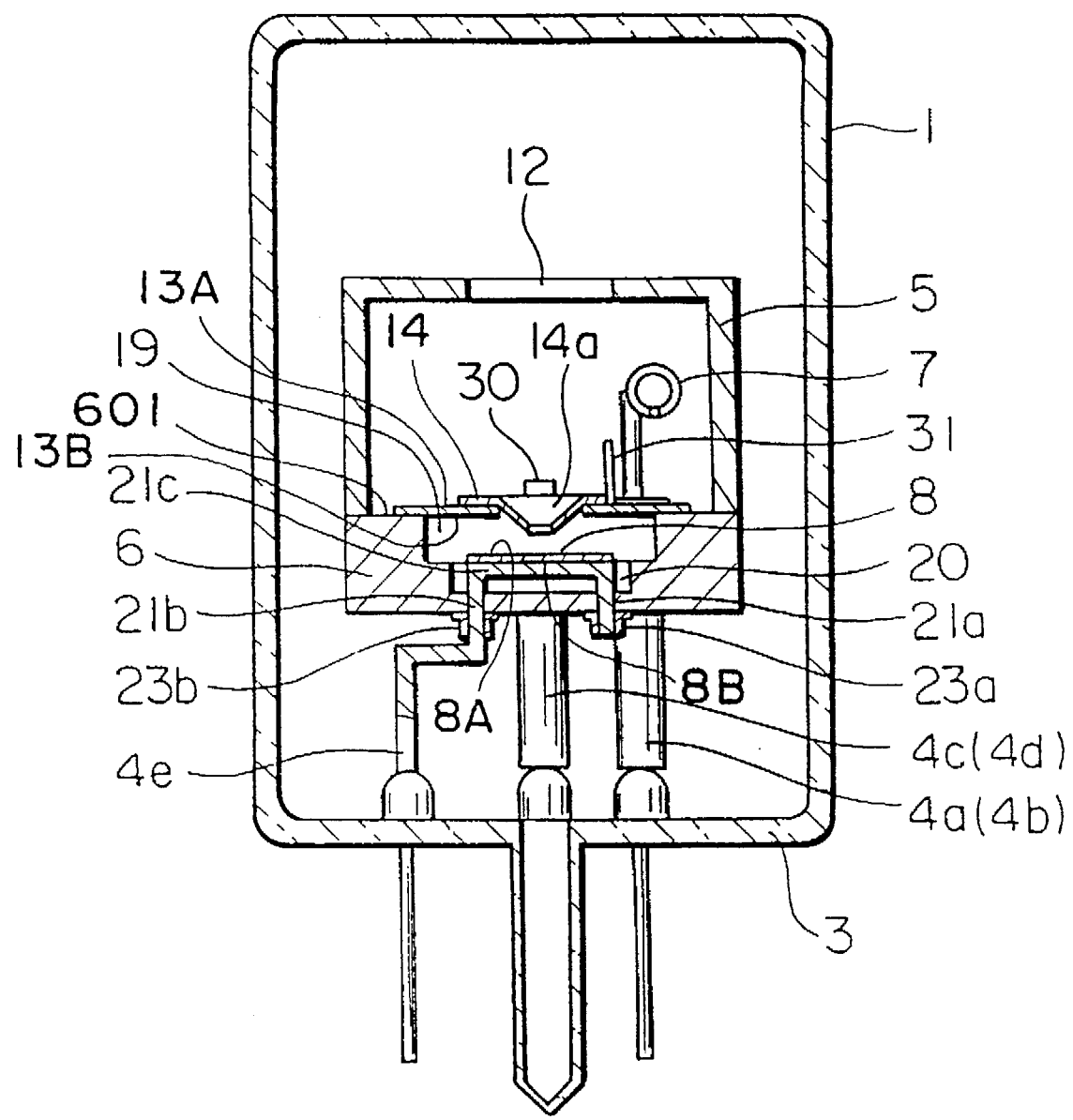
FIG. 10 is a sectional view of the gas discharge tube taken along a line D—D in FIG. 9.

The present invention is not limited to the above embodiment and can also be applied to, e.g., a head-on type deuterium discharge tube as shown in FIGS. 9 and 10. The same reference numerals as in the above embodiment denote the same parts.

As shown in FIGS. 9 and 10, to increase the heat dissipation efficiency, the front electrode 5 is formed of a ceramic and fixed to the front surface of the discharge shielding member 6. The opening window 12 is formed in the front electrode 5 at its center portion so as to be used for the head-on type. In addition, a rear surface 13B of the focusing electrode 13 is fixed to the first surface 601 of the front surface of the discharge shielding member 6 and fixed to the distal ends of the lead pins 4c and 4d extending through the discharge shielding member 6 through eyelets 30. The hot cathode 7 is housed in the front electrode 5 to project from the focusing electrode 13. A discharge straightening plate 31 stands on the front surface 13A of the focusing electrode 13. This discharge straightening plate 31 is located between the hot cathode 7 and the discharge focusing plate 14 which is arranged at the center of the focusing electrode plate 13.

The box-like discharge shielding member 6 is integrally formed of a ceramic having electrical insulating properties and a high thermal conductivity. The discharge shielding portion 6 has the first depression 19 formed from the first surface 601 of the front surface toward the rear surface 6A of the discharge shielding member 6. The periphery of the plate-like anode 8 is supported in contact with the bottom surface 603 of the second depression 19 for accommodating the anode plate 8. The second depression 20 is formed in the bottom surface 603 of the first depression 19 at its center to increase the heat dissipation efficiency of the anode 8. The second depression 20 will accommodate the base portion 21c of the U-shaped connecting pin 21 which is fixed to the rear surface 8B of the anode plate 8. The first and second end portions 21a and 21b of the connecting pin 21 project from the rear surface 6A of the discharge shielding member 6.

Therefore, with a simple operation such that the eyelets 23a and 23b are firmly fitted on the first and second end portions 21a and 21b projecting from the rear surface 6A of the discharge shielding member 6, the anode 8 will be firmly held by the bottom surface 603 of the first depression 19. The distal ends of the lead pins 4a and 4b are fixed to the electrode rods 7a and 7b of the hot cathode 7 by welding or the like. The distal end of the lead pin 4e is fixed to the second end portion 21b of the connecting pin 21 arranged on the rear surface 8B of the anode plate 8 by welding or the like. The rear surface of the focusing electrode 13 and the front surface 8A of the anode plate 8 face each other.

An operation based on the arrangement of the above-described head-on type deuterium discharge tube will be described below.

First of all, the hot cathode 7 is energized and sufficiently heated. Thereafter, a predetermined trigger voltage (e.g., 350 to 500 V) is applied between the hot cathode 7 and the anode 8 through the lead pins 4a to 4e. Thermoelectrons emitted from the hot cathode 7 are straightened by the discharge straightening plate 31 and converged by the focusing opening 14a of the focusing electrode plate 14, which is directly on the front surface 13A of the focusing electrode 13, to reach the anode plate 8. At this time, arc discharge occurs in front of the focusing opening 14a. Ultraviolet light extracted from an arc ball by the arc discharge passes through the opening window 12 of the front electrode 5 and is externally emitted through the glass envelope 1.

The gas discharge tube according to the present invention has the above arrangement and will provide the following effect.

More specifically, the anode is supported by the bottom surface of the anode accommodation space (first depression) formed from the front surface to the rear surface of the discharge shielding member, and the focusing electrode plate is fixed to the front surface of the discharge member while keeping a constant distance from the anode plate. With this arrangement, since the anode and the focusing electrode are firmly held by the discharge shielding member, deformation hardly occurs even in a high temperature state during long-time continuous light emission. Therefore, a high positional precision between the anode and the focusing electrode plate will be satisfactorily maintained. In addition, the operational stability of the gas discharge tube will be improved, and the service life will be prolonged.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims. The basic Japanese Application No. 6-207715 filed on Aug. 31, 1994 is hereby incorporated by reference.

What is claimed is:

1. A gas discharge tube, comprising:

an envelope for sealing a gas therein;

a hot cathode disposed in said envelope, for emitting thermoelectrons;

an anode disposed in said envelope, for receiving the thermoelectrons emitted from said hot cathode;

a focusing electrode disposed in said envelope, said focusing electrode having a focusing opening for converging and passing thermoelectrons which are emitted from said hot cathode and which are received by said anode; and a discharge shielding member of an insulator having a front surface for supporting said focusing electrode at a predetermined position, said front surface of said discharge shielding member being defined by:

a first surface being in direct contact with said focusing electrode, for defining a position of said focusing electrode;

a second surface continued from said first surface, for defining a distance between said focusing electrode and said anode; and a third surface continued from said second surface, said third surface being in direct contact with said anode, for defining a position of said anode, wherein said second and third surfaces of said front surface of said discharge shielding member form a first depression for supporting and accommodating said anode.

2. A gas discharge tube according to claim 1, wherein said discharge shielding member further has a rear surface which is opposite said front surface of said discharge shielding member, and through holes passing from said third surface of said front surface to said rear surface of said discharge shielding member.

3. A gas discharge tube according to claim 2, further comprising a connecting pin fixed on a rear surface of said anode, said rear surface of said anode being in direct contact with said third surface of said front surface of said discharge shielding member, wherein both ends of said connecting pin project from said rear surface of said discharge shielding member through said through holes.

4. A gas discharge tube according to claim 3, wherein at least one of said ends of said connecting pin is fixed at a distal end of a lead pin for setting said anode at a predetermined potential, said lead pin introduced into an inner space of said envelope from outside of said envelope.

5. A gas discharge tube according to claim 1, further comprising a front electrode mounted on said front surface of said discharge shielding member, for accommodating said hot cathode and shielding discharge of said hot cathode, whereby said hot cathode is housed in a space defined by said front electrode and said focusing electrode.

6. A gas discharge tube according to claim 5, wherein said front electrode has a window at a position opposite said anode through said focusing opening of said focusing electrode, for outputting light caused by gas discharge.

7. A gas discharge tube according to claim 5, further comprising a cathode electrode disposed in said space, for shielding discharge of said hot cathode, said cathode electrode having a slit for passing the thermoelectrons emitted from said hot cathode.

8. A gas discharge tube according to claim 1, further comprising:

a connecting pin fixed on a rear surface of said anode, said rear surface of said anode being in direct contact with said third surface of said front surface of said discharge shielding member; and a second depression for partially accommodating said connecting pin, at said third surface of said front surface of said discharge shielding member.

9. A gas discharge tube according to claim 1, wherein said discharge shielding member is made of a ceramic.

10. A gas discharge tube, comprising:

an envelope for sealing a gas therein;

lead pins introduced into an inner space of said envelope from outside of said envelope; and a light-emitting section in said envelope, positioned at distal ends of said lead pins and supported by said lead pins while spaced from an inner side wall of said envelope, said light-emitting section including:

a hot cathode for emitting thermoelectrons;

an anode for receiving the thermoelectrons emitted from said hot cathode;

a focusing electrode having a focusing opening for converging and passing thermoelectrons which are emitted from said hot cathode and which are received by said anode; and a discharge shielding member of an insulator having a front surface for supporting said focusing electrode at a predetermined position and a first depression for accommodating said anode, wherein said first depression is defined by a bottom surface for supporting said anode at a predetermined position and a side surface which communicates said front surface to said bottom surface and which defines a distance between said focusing electrode and said anode.

11. A gas discharge tube according to claim 10, wherein said discharge shielding member further has a rear surface which is opposite said front surface of said discharge shielding member, and through holes passing from said bottom surface of said first depression to said rear surface of said discharge shielding member.

12. A gas discharge tube according to claim 11, further comprising a connecting pin fixed on a rear surface of said anode, said rear surface of said anode being in direct contact with said bottom surface of said first depression of said discharge shielding member, wherein both ends of said connecting pin project from said rear surface of said discharge shielding member through said through holes.

13. A gas discharge tube according to claim 12, wherein at least one of said ends of said connecting pin is fixed at a distal end of a lead pin for setting said anode at a predetermined potential, said lead pin introduced into an inner space of said envelope from outside of said envelope.

14. A gas discharge tube according to claim 10, further comprising a front electrode mounted on said front surface of said discharge shielding member, for accommodating said hot cathode and shielding discharge of said hot cathode, whereby said hot cathode is housed in a space defined by said front electrode and said focusing electrode.

15. A gas discharge tube according to claim 14, wherein said front electrode has a window at a position opposite said anode through said focusing opening of said focusing electrode, for outputting light caused by gas discharge.

16. A gas discharge tube according to claim 14, further comprising a cathode electrode disposed in said space, for shielding discharge of said hot cathode, said cathode electrode having a slit for passing the thermoelectrons emitted from said hot cathode.

17. A gas discharge tube according to claim 10, further comprising:

a connecting pin fixed on a rear surface of said anode, said rear surface of said anode being in direct contact with said bottom surface of said first depression provided at said front surface of said discharge shielding member; and a second depression for partially accommodating said connecting pin, at a bottom surface of said first depression of said discharge shielding member.

18. A gas discharge tube according to claim 10, wherein said discharge shielding member is made of a ceramic.

* * * * *